Dec. 12, 1950     T. C. WHITEHEAD     2,533,861
ANGULARLY ADJUSTABLE BRACKET ARM MOUNTING
Filed Feb. 2, 1948
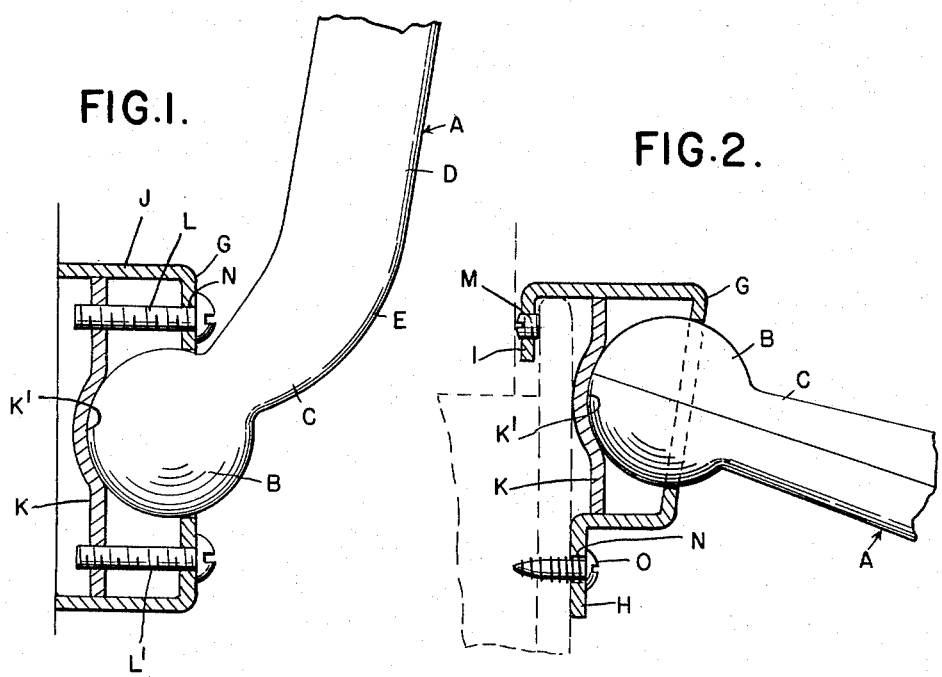
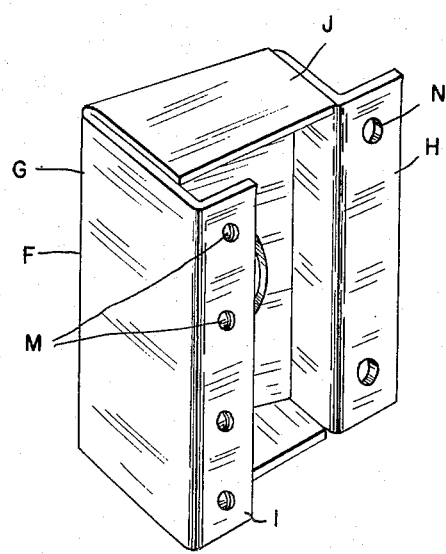
FIG.3.
*INVENTOR.*
THOMAS C. WHITEHEAD
*BY*
Whittemore Hulbut &Belknap
ATTORNEYS Patented Dec. 12, 1950

2,533,861

UNITED STATES PATENT OFFICE 2,533,861

ANGULARLY ADJUSTABLE BRACKET ARM MOUNTING

Thomas C. Whitehead, Detroit, Mich., assignor to Whitehead Stamping Company, Detroit, Mich., a corporation of Michigan Application February 2, 1948, Serial No. 5,724

7 Claims. (Cl. 248—226)

The invention relates to bracket arms such as are used for supporting rear vision mirrors on motor vehicles, and has for its object the obtaining of a construction particularly adapted for use on trucks and commercial vehicles.

It is a further object to obtain a construction of angularly adjustable bracket arm provided with means for delicately adjusting the frictional resistance to angular movement so that, while the arm normally remains stationary, it is easily displaced by contact with any obstruction.

Still further it is an object of the invention to obtain a construction of attachment means to the door or other portion of the vehicle which is easily applied and firmly secured. With these and other objects in view the invention consists in the construction as hereinafter set forth.

In the drawings:

Fig. 1 is an elevation of my improved bracket arm with the securing base therefor shown in vertical section;

Fig. 2 is a plan view with the base member in horizontal section;

Fig. 3 is a perspective view of the base member detached from the arm.

A is the bracket arm, preferably formed of pressed sheet metal half sections having semi-spherical inner end portions B and a contracted neck portion C between the same and the outer semi-cylindrical portions D of the arm. There is also interposed between the portions C and D an elbow portion E so that the axis of the neck portion C is at a predetermined angle to the axis of the outer portion D. F is a base member for securing the arm to the portion of the vehicle on which it is mounted and which is of the following construction. A sheet metal blank is either folded or pressed to form a substantially rectangular hollow body G which is open at the rear. The opposite vertical side portions of the body G are extended to form, respectively, a laterally projecting flange H and an inwardly bent flange I, the former being in the plane of the rear edges of the top and bottom portions J and the inwardly bent flange I being rearwardly spaced into a parallel plane. This is for the purpose of embracing a flange on the supporting body such as the rear edge flange of the door. The front wall of the body member G has a circular aperture therein of a diameter slightly less than the diameter of the spherical portion of the arm, thus forming a bearing for said spherical portion when placed inside the body. The neck portion C being of smaller diameter permits of universal angular adjustment of the arm within predetermined limits or until the neck comes in contact with the front wall. This would not be sufficient to adjust the arm into vertical position but by reason of the elbow E the portion D of the arm approaches the vertical.

To hold the spherical portion of the arm in engagement with its socket, a plate K is provided which is of dimensions to fit within the hollow member. This plate has a concave socket portion K' for engaging the spherical portion of the arm, and above and below this socket portion are screws L and L' having threaded engagement with said plate. The heads of the screws are outside the front wall so as to be accessible when a member F is mounted on the vehicle and, as the plate K is formed of resilient material, this may be tensioned by the tightening of the screws. Furthermore, this tension may be easily adjusted so as to produce just the desired amount of friction on the portion B to normally hold the arm in adjusted position but permitting its displacement should it strike some obstruction.

The inwardly bent flange I has a series of threaded apertures therein for receiving clamping screws M and the flange H is also provided with unthreaded apertures N. Thus in mounting the member F the flange I is first secured to the flange of the door, or other mounting member, by the clamping screws M after which the flange H can also be secured. This is preferably accomplished by the use of self thread-cutting screws O which are engaged with the apertures N and forced into the body of the door. When tightened the heads of these screws will securely clamp the flange H to the body of the door.

The elbow E in the arm A is not only useful in permitting said arm to assume a nearly vertical position but also otherwise facilitates adjustment of the mirror or other member mounted on the arm. This is because the outer end of the arm is eccentric to the axis of the neck portion and is therefore capable of movement without rocking of the latter.

What I claim as my invention is:

1. A bracket arm construction, comprising an arm having a spherical inner end portion, a hollow sheet metal supporting base therefor open at the rear and having extending along its opposite vertical sides respectively a laterally outwardly projecting flange and an inwardly bent flange spaced to the rear to embrace an edge portion of a member on which said arm is to be mounted, the front wall of said base member being apertured for the passage of said arm and having an annular surrounding bearing for engagement with said spherical portion, means within said hollow member for frictionally engaging said spherical portion, a clamping screw engaging a threaded aperture in said inwardly bent flange, and a thread-cutting screw engaging an aperture in said lateral flange and adapted to be forced into threaded engagement with said supporting member.

2. A bracket arm construction, comprising an arm having a spherical inner portion, a hollow sheet metal base member open at the rear and having extending along its opposite vertical sides respectively a laterally outwardly projecting flange and an inwardly bent flange spaced to the rear to embrace an edge portion of a member on which said arm is to be mounted, the front wall of said base member being apertured for the passage of said arm and having an annular surrounding bearing for engagement with said spherical portion, a plate within said hollow base member bearing against said spherical portion, means adjustable from the front of said hollow base member for tensioning said plate to produce a frictional resistance to the angular movement of said arm, a screw engaging a threaded aperture in said inwardly bent flange to clamp against the embraced portion of the member on which said arm is to be mounted, and a thread-cutting screw engaging an aperture in said lateral flange and adapted to be forced into threaded engagement with the supporting member.

3. A bracket arm construction, comprising an arm having a spherical portion at its inner end, a contracted neck adjacent to said spherical portion and an elbow between said neck and the outer portion of said arm, a hollow sheet metal supporting base open at the rear and having extending along its opposite vertical sides respectively a laterally outwardly projecting flange and an inwardly bent flange spaced to the rear to embrace an edge portion of a member on which said arm is to be mounted, a front wall of said base member being apertured for the passage of said arm and having an annular surrounding bearing for engagement with said spherical portion, a plate within said hollow base member bearing against said spherical portion, a plurality of screws passing through the front wall of said hollow member and threadedly engaging said plate to adjust the same for frictional engagement with said spherical portion, a screw engaging a threaded aperture in said inwardly bent flange for clamping against said embraced portion of the member on which said arm is to be mounted, and a thread-cutting screw engaging an aperture in said lateral flange and adapted to be forced into threaded engagement with the supporting member.

4. A bracket arm construction comprising an arm having a spherical inner end portion, a substantially straight outer end portion, an elbow between said spherical portion and said straight portion, and a contracted neck portion between said elbow and said spherical portion, a hollow sheet metal base member open at the rear and provided at said open rear thereof along its opposite vertical sides with a laterally outwardly projecting flange and an inwardly bent flange, the former being substantially in the plane of the rear edges of the top and bottom portions of the base member and having unthreaded apertures therein, and the latter being spaced to the rear of said base member to embrace an edge portion of a member on which said arm is to be mounted and having threaded apertures therein, the front wall of said base member having a circular opening of a diameter slightly less than the diameter of said spherical portion, the edges of said circular opening forming a bearing for said spherical portion, means for frictionally holding said spherical portion in engagement with said bearing and to produce a frictional resistance to the angular movement of said arm, including a plate of resilient material within said base member having a concave portion engaging said spherical portion, means extending through a wall of said base member and threadedly engaging said plate to tension the same, means engaging said threaded apertures in said inwardly bent flange for clamping against said embraced portion of the member on which said arm is to be mounted, and means engaging said unthreaded apertures in said lateral flange and adapted to be forced into anchoring engagement with the supporting member.

5. A bracket arm construction comprising an arm having a spherical end portion, a hollow sheet metal base member open at the rear and provided at said open rear thereof along its opposite vertical sides with a laterally outwardly projecting flange and an inwardly bent flange, the former being substantially in the plane of the rear edges of the top and bottom portions of the base member and having unthreaded apertures therein, the latter being spaced to the rear of said base member to embrace an edge portion of a member on which said arm is to be mounted and having threaded apertures therein, the front wall of said base member having a circular opening of a diameter slightly less than the diameter of said spherical portion, the edges of said circular opening forming a bearing for said spherical portion, means for frictionally holding said spherical portion in engagement with said bearing and to produce a frictional resistance to the angular movement of said arm, including a plate of resilient material within said base member engaging said spherical portion, means extending through a wall of said base member and threadedly engaging said plate to tension the same, means engaging said threaded apertures in said inwardly bent flange for clamping against said embraced portion of the member on which said arm is to be mounted, and means engaging said unthreaded apertures in said lateral flange and adapted to be forced into anchoring engagement with the supporting member.

6. A bracket arm construction comprising an arm having a spherical end portion, a hollow sheet metal base member open at the rear and provided at said open rear thereof along its opposite vertical sides with a laterally outwardly projecting flange and an inwardly bent flange, the former being substantially in the plane of the rear edges of the top and bottom portions of the base member and having unthreaded apertures therein, the latter being spaced to the rear of said base member to embrace an edge portion of a member on which said arm is to be mounted, the front wall of said base member having a circular opening of a diameter slightly less than the diameter of said spherical portion, the edges of said circular opening forming a bearing for said spherical portion, means for frictionally holding said spherical portion in engagement with said bearing and to produce a frictional resistance to the angular movement of said arm, including a plate of resilient material within said base member engaging said spherical portion, means extending through a wall of said base member and threadedly engaging said plate to tension the same, and means engaging said unthreaded apertures in said lateral flange and adapted to be forced into anchoring engagement with the supporting member.

7. A supporting base for a bracket arm having an enlarged spherical inner end portion; comprising a hollow rectangular member formed from a flat blank having in its central portion a circular aperture of a diameter smaller than that of said spherical portion for the passage therethrough of said arm, the edge of said aperture forming an annular bearing on said spherical portion, said blank also having portions bent to form the four sides of said rectangular member, two of said sides having flanges at their outer ends extending laterally, respectively, outward and inward therefrom, the outwardly extending flange being flush with the outer edges of the other two sides of said rectangular member, and the inwardly extending flange being spaced from said edges to embrace therebetween the edge portion of the member on which said base is to be mounted, securing means engaging said flanges, and adjustable means within said hollow base for frictionally engaging the spherical portion of said arm.

THOMAS C. WHITEHEAD.

REFERENCES CITED

The following references are of record in the file of this patent:

UNITED STATES PATENTS

| Number | Name | Date |
| --- | --- | --- |
| 1,944,468 | Schaffner | Jan. 23, 1934 |
| 2,167,962 | Sovis | Aug. 1, 1939 |
| 2,309,333 | Bahr | Jan. 26, 1943 |
| 2,338,780 | Poncher et al. | Jan. 11, 1944 |